March 24, 1959     H. W. HEIDERGOTT ET AL     2,878,556
DEVICES FOR ASSEMBLING ARTICLES
Filed July 25, 1956     2 Sheets-Sheet 1
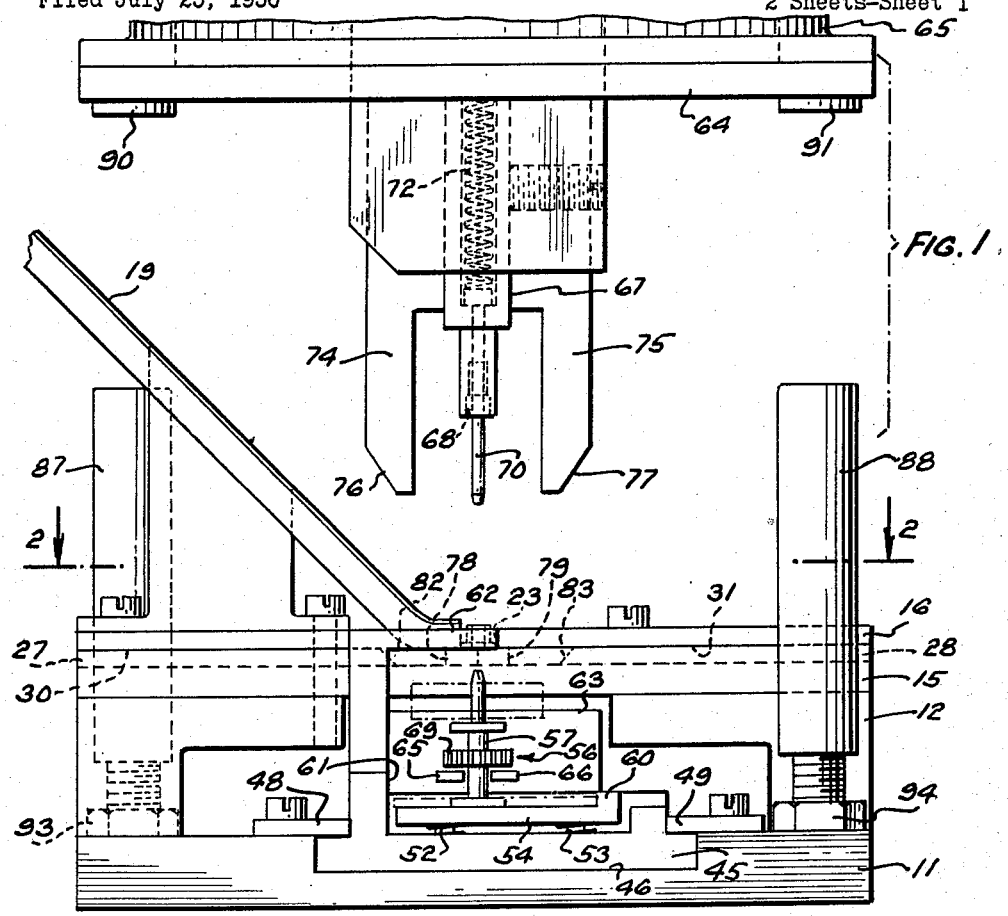
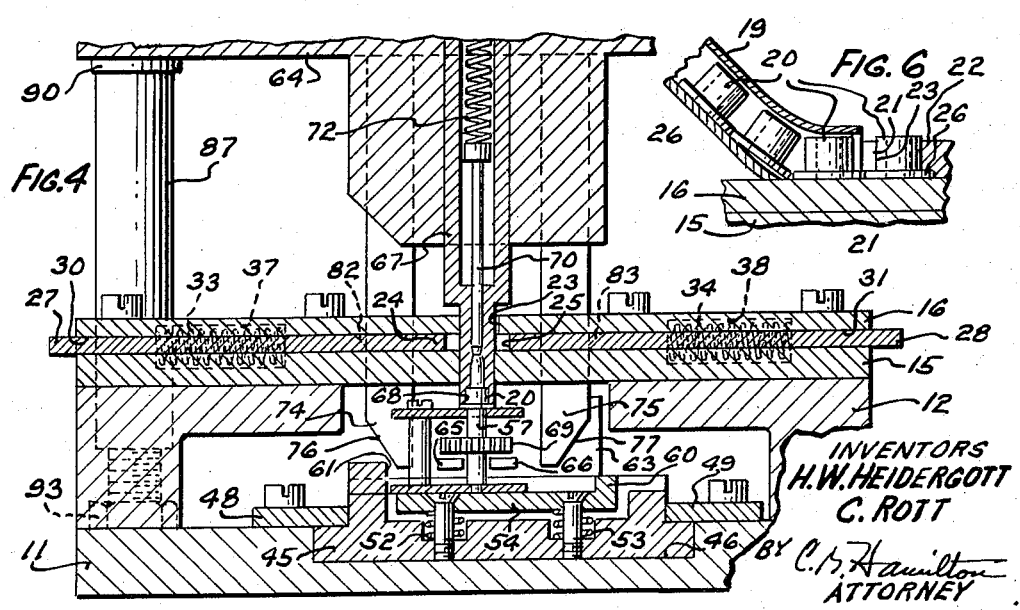
INVENTORS
H. W. HEIDERGOTT
C. ROTT
BY C. H. Hamilton
ATTORNEY

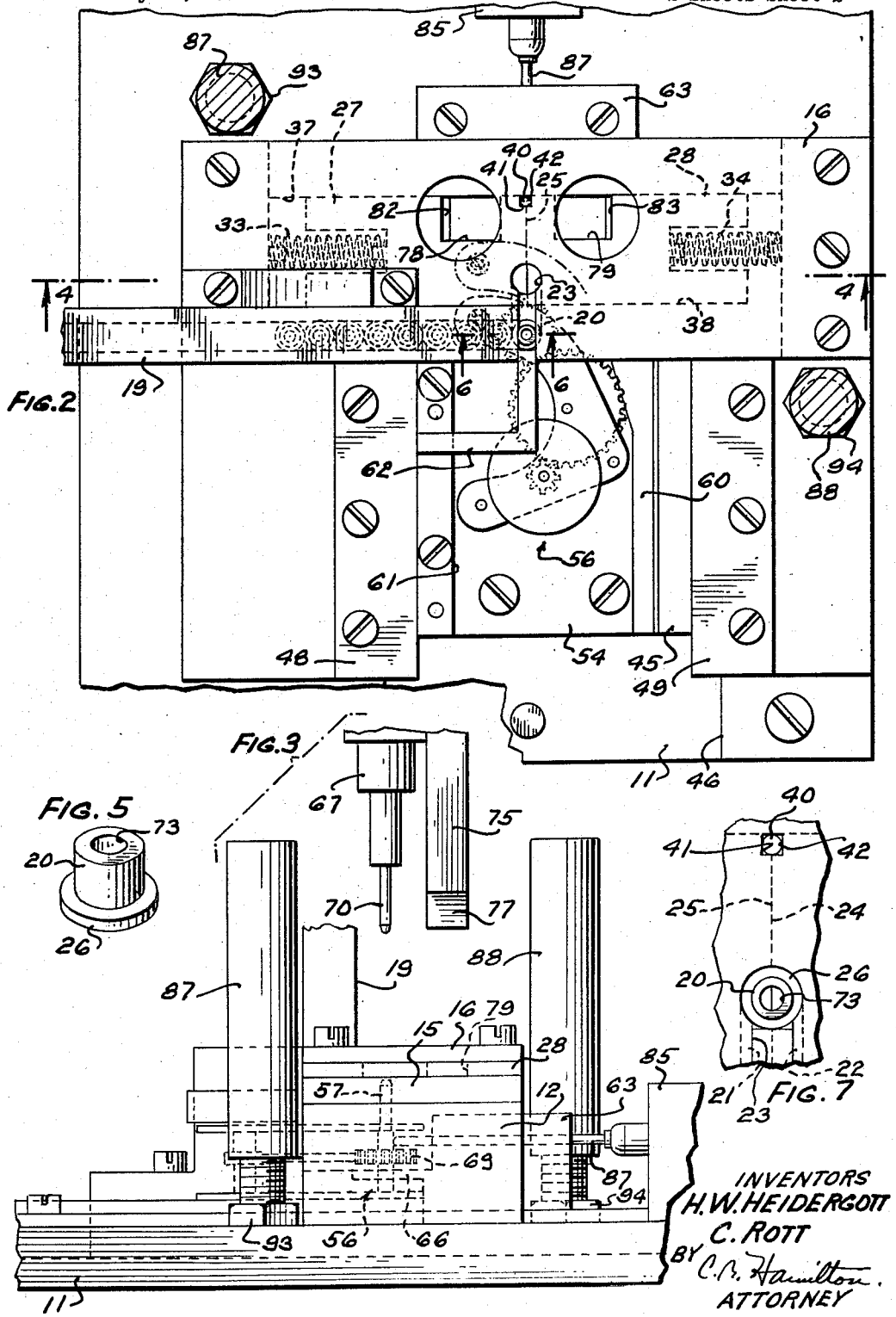

United States Patent Office 2,878,556
Patented Mar. 24, 1959

2,878,556

DEVICES FOR ASSEMBLING ARTICLES

Harry W. Heidergott and Clarence Rott, Indianapolis, Ind., assignors to Western Electric Company, Incorporated, New York, N.Y., a corporation of New York Application July 25, 1956, Serial No. 599,955

4 Claims. (Cl. 29—211)

This invention relates to devices for assembling articles and more particularly to devices for assembling bushings on shafts of gear train assemblies.

An object of this invention is to provide a device for assembling bushings on shafts.

Another object of this invention is to provide a device for automatically pressing a bushing onto a shaft of a gear train assembly when it is moved into work position.

One embodiment of the present invention may include an inclined chute for feeding bushings into position on abutting ends of a pair of spring loaded plates positioned above a vertically held shaft upon which the bushing is to be assembled. A ram is then actuated downward to move a spring loaded guide pin into the bushing and to cam the spring loaded plates apart whereby the bushing moves downward on the guide pin into assembling position on the shaft, whereupon an element carried by the ram engages the bushing to force it onto the shaft.

Other objects and advantages of the invention will become apparent by reference to the following detailed description and the accompanying drawings illustrating a preferred embodiment of the invention, in which Fig. 1 is a front view of the device showing the ram in raised inoperative position;

Fig. 2 is a plan view taken on line 2—2 of Fig. 1 showing the gear train assembly in feed position;

Fig. 3 is an end view of the disclosure of Fig. 1 showing the switch which is actuated when the gear train assembly is moved into work position;

Fig. 4 is a vertical cross-sectional view taken on line 4—4 of Fig. 2 showing the device in operative position;

Fig. 5 is an enlarged perspective view of a bushing to be assembled on a shaft;

Fig. 6 is an enlarged fragmentary cross-sectional view taken on line 6—6 of Fig. 2 showing bushings in the chute and in feed position; and Fig. 7 is an enlarged fragmentary plan view showing the abutting spring loaded plates supporting a bushing in position to be assembled on a shaft.

Referring now in detail to the drawings, a base 11 is shown supporting a recessed block 12 upon which is mounted supporting plates 15 and 16. An inclined chute 19 containing a supply of bushings 20 is mounted on the supporting plate 16 and positioned to direct the bushings 20 one by one into a slot 23 (Figs. 2, 4, 6 and 7) in the supporting plate 16. Flanges 21 and 22 on the plate 16 engage a flange 26 on the bushing 20 to retain it in the slot 23 on abutting ends 24 and 25 of plates 27 and 28 slidably mounted in recesses 30 and 31, respectively, between the supporting plates 15 and 16. Compression springs 33 and 34 positioned in recesses 37 and 38 in plates 15 and 16 (Figs. 2 and 4) urge the plates 27 and 28 toward each other whereby the ends 24 and 25 are in abutting relationship directly beneath the slot 23 in the plate 16. A pin 40 (Figs. 2 and 7) secured to the supporting plate 15 engages surfaces 41 and 42 of plates 27 and 28 to insure that the abutting ends 24 and 25 are centered beneath the slot 23 in the supporting plate 16.

A feed carriage 45 slidably mounted in a recess 46 in the base 11 and held therein by members 48 and 49 secured to the base 11 carries a plate 54 which is resiliently supported on springs 52 and 53 (Figs. 1 and 4). A gear train assembly 56 having a shaft 57 upon which a bushing 20 is to be assembled is manually positioned on the resiliently supported plate 54, and is held thereon against transverse movement by a rib 60 on the plate 54 and by a surface 61 of the feed carriage 45. A pusher element 62 carried by the feed carriage moves through the slot 23 in the supporting plate 16 to engage the bushing 20 and move it along the slot 23 as the gear train assembly 56 is moved into work position, the pusher element maintaining the bushing 20 directly above the shaft 57. When the feed carriage moves toward work position, the pusher element 62 closes the chute 19 to retain the bushings 20 therein until the feed carriage 45 is withdrawn, whereupon the lowermost bushing 20 in the chute 19 moves into the slot 23 in the plate 16. A block 63 secured to the base 11 is provided with horizontal projections (Figs. 1, 4 and 5) 65 and 66 spaced on opposite sides of the shaft 57 for engaging a gear 69 rigidly secured to the shaft 57 to support it when the bushing 20 is forced thereon.

A ram 64 positioned above the base 11 and actuated by an air cylinder 65 (Fig. 1) carries a hollow rod 67 having in its lower end a recess 68 (Figs. 1 and 4) adapted to receive the bushing 20 to force it onto the shaft 57 of the gear train assembly 56. A guide pin 70 slidably mounted in the hollow rod 67 and urged downward by a spring 72 is positioned to enter a hole 73 (Fig. 5) in the bushing 20 for centering it on the shaft 57 when the ram 64 is lowered.

A pair of members 74 and 75 having cam surfaces 76 and 77 thereon are carried downward by the ram 64 to enter recesses 78 and 79 in the plates 27 and 28, respectively, whereby the cam surfaces 76 and 77 engage surfaces 82 and 83 on the plates 27 and 28 to urge the plates apart against the action of the springs 33 and 34 (Figs. 2 and 4). This permits the guide pin 70 to move downward into engagement with the upper end of the shaft 57, and then upon further movement of the plates 27 and 28 permits the bushing 20 to drop down the guide pin 70 into assembly position on the top end of the shaft 57. The hollow rod 67 then engages the bushing 20 to force it onto the shaft 57.

A switch 85 (Figs. 2 and 4) for controlling the operation of the air cylinder is mounted on the base 11 and provided with an actuating pin 87 which is engaged and moved by the shaft 57 to close the switch 85 when the gear train assembly 56 is moved into work position. The closing of the switch 85 actuates a solenoid valve (not shown) to admit compressed air to the cylinder 65 to lower the ram 64. The upper ends of posts 87 and 88 threaded into the base 11 engage stops 90 and 91, respectively, carried by the ram 64 to limit downward movement of the ram 64, and the hollow rod 67. Lock nuts 93 and 94 on the posts 87 and 88 hold them in adjusted positions whereby the lowermost position of the ram 64 can be set at a predetermined location to adjust the position of the bushing 20 assembled on the shaft 57.

In operation of the device to assemble a bushing 20 on the shaft 57 of the gear train assembly 56, an operator manually places the gear train assembly on the plate 54 and moves the feed carriage 45 to carry the gear train assembly into work position. As the feed carriage 45 moves toward work position the pusher element 62 engages the bushing 20 positioned in the slot 23 and moves it into a position directly beneath the guide pin 70, at which time the shaft 57 engages the pin 87 and closes the switch 85.

The closing of switch 85 actuates the solenoid valve to admit compressed air to the cylinder (Fig. 1) to lower the ram 64 which carries the guide pin 70, the hollow rod 67 and the members 74 and 75 downward. The guide pin 70 enters the hole 73 in the bushing 20 and is stopped by engagement with the plates 27 and 28. Upon further downward movement of the ram 64, the cam surfaces 76 and 77 on the members 74 and 75 engage the surfaces 82 and 83 on the plates 27 and 28, respectively, and cam them apart against the action of springs 33 and 34. When the distance between the ends 24 and 25 of the plates 27 and 28 is sufficient, the spring loaded guide pin 70 passes between the plates and engages the top end of the shaft 57. Upon further movement of the plates 27 and 28 the space between the edges 24 and 25 is great enough to permit the bushing 20 to drop downward along the guide pin 70 into assembling position on the shaft 57. The hollow rod 67 continues to move downward until the bushing 20 enters the recess 68 therein, whereupon the bushing 20 is forced onto the shaft 57.

The electrical connection between the switch 85 and the solenoid valve is then manually broken whereby the air cylinder is actuated to raise the ram 64 which lifts the hollow rod 67, the guide pin 70 and the members 74 and 75, thus permitting the plates 27 and 28 to return to abutting relationship. The operator then manually withdraws the feed carriage 45 and the pusher element 62 clears the end of the chute 19 to permit another bushing 20 to move into the slot 23. The assembled gear train assembly 56 and bushing 20 are removed from the plate 54 and another gear train assembly 56 is positioned thereon. The above-described procedure is then repeated.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A device for assembling bushings on shafts of articles, comprising a base, means on the base for supporting an article having a shaft, a pair of plates slidably mounted on the base and having abutting ends for supporting an apertured bushing to be assembled on the shaft, means on the base for retaining the bushing in engagement with the abutting ends of the pair of plates, a ram mounted on the base, means for actuating the ram, a pin carried by the ram for entering the aperture in the bushing to carry it into engagement with the shaft, camming means carried by the ram for separating the pair of plates to permit the pin to engage the end of the shaft, and means carried by the ram for forcing the bushing off the pin and onto the shaft.

2. A device for assembling apertured bushings on shafts of articles, comprising a base, means on the base for supporting an article having a shaft, a pair of plates slidably mounted on the base in abutting relationship, means urging the plates into said abutting relationship, means on the base for feeding a bushing into position on the abutting plates, a ram mounted on the base, means for actuating the ram, a pin mounted on the ram for entering the aperture in the bushing to retain it into axial alignment with the shaft, means carried by the ram for camming the pair of plates apart to permit the pin to pass therebetween into engagement with the end of the shaft and the bushing to move along the pin to engage the shaft, means carried by the ram for engaging the bushing to force it onto the shaft, and means on the base for limiting movement of the ram toward the article.

3. A device for assembling apertured bushings on shafts of articles, comprising a base, a movable carriage on the base for supporting an article having a shaft, a pair of abutting plates slidably mounted above the article on the carriage, means on the base for urging the plates together, means on the base for feeding apertured bushings in single order into position on the abutting plates, a ram supported above the base, means for actuating the ram, a pin on the ram for entering the aperture in the bushing to guide it onto the shaft, a pair of camming members carried by the ram for moving the slidable plates apart to permit the pin to pass between them and engage the end of the shaft and to permit the bushing to drop downward on the pin into engagement with the shaft, means carried by the ram for engaging the bushing to force it onto the shaft, and means on the base responsive to the position of the shaft for controlling the ram actuating means.

4. A device for assembling bushings on shafts of articles, comprising a base, means on the base for supporting an article having a shaft, a pair of abutting plates slidably mounted on the base, means on the base for urging the plates together, a chute for containing a supply of bushings, a pusher element movably mounted on the base for feeding the bushings one at a time into a position on the plates and above the shaft, a ram movably mounted on the base, a pair of camming members mounted on the ram for engaging the plates to push them apart whereby the bushing thereon is free to drop to the shaft, a pin resiliently mounted on the ram for passing through the bushing and engaging the end of the shaft for guiding the bushing onto the shaft, said ram being aligned with the shaft for forcing the bushing onto said shaft.

References Cited in the file of this patent
UNITED STATES PATENTS

| 979,438 | Courtney | Dec. 27, 1910 |
| 1,134,507 | Blevney | Apr. 6, 1915 |
| 1,833,268 | Spry | Nov. 29, 1931 |
| 2,604,692 | Broden | July 29, 1952 |
| 2,683,924 | Schryver | July 20, 1954 |